United States Patent
Tsao

(10) Patent No.: US 8,149,334 B2
(45) Date of Patent: Apr. 3, 2012

(54) PIP PROCESSING APPARATUS AND METHOD THEREOF

(75) Inventor: Sheng-Che Tsao, Taipei (TW)

(73) Assignee: Via Technologies, Inc., Taipei (TW)

( * ) Notice: Subject to any disclaimer, the term of this patent is extended or adjusted under 35 U.S.C. 154(b) by 1581 days.

(21) Appl. No.: 11/543,038

(22) Filed: Oct. 5, 2006

(65) Prior Publication Data

US 2007/0291176 A1    Dec. 20, 2007

(30) Foreign Application Priority Data

Jun. 20, 2006 (TW) ................................ 95122174 A

(51) Int. Cl.
   *H04N 5/50* (2006.01)
(52) U.S. Cl. ...................................................... 348/565
(58) Field of Classification Search .................. 348/565, 348/563, 564, 566, 588, 569, 584, 586, 589
   See application file for complete search history.

(56) References Cited

U.S. PATENT DOCUMENTS

| | | | | |
|---|---|---|---|---|
| 5,680,177 A | * | 10/1997 | Abe | 348/564 |
| 5,801,785 A | * | 9/1998 | Crump et al. | 348/563 |
| 6,317,164 B1 | * | 11/2001 | Hrusecky et al. | 348/581 |
| 6,844,878 B2 | * | 1/2005 | Hentschel et al. | 345/421 |
| 7,006,153 B2 | * | 2/2006 | Ohtsuki et al. | 348/584 |
| 7,088,376 B2 | * | 8/2006 | Park | 345/629 |
| 7,292,294 B2 | * | 11/2007 | Hung et al. | 349/106 |
| 7,486,337 B2 | * | 2/2009 | Bian | 348/589 |
| 7,489,363 B2 | * | 2/2009 | Choi | 348/581 |
| 7,844,988 B2 | * | 11/2010 | Noh | 725/46 |
| 2003/0122960 A1 | * | 7/2003 | Lafon | 348/441 |
| 2004/0168185 A1 | * | 8/2004 | Dawson et al. | 725/38 |
| 2005/0046746 A1 | * | 3/2005 | Choi | 348/565 |
| 2006/0156345 A1 | * | 7/2006 | Ozawa | 725/58 |

FOREIGN PATENT DOCUMENTS

| | | |
|---|---|---|
| CN | 1578447 A | 2/2005 |
| KR | 10-2005-0122808 A | 12/2005 |
| TW | 267288 A | 8/1983 |
| WO | WO-02/25940 A1 | 3/2002 |

* cited by examiner

*Primary Examiner* — Paulos Natnael
(74) *Attorney, Agent, or Firm* — Birch, Stewart, Kolasch & Birch, LLP

(57) ABSTRACT

A PIP (Picture In Picture) processing apparatus processes a main image and a secondary image and includes a scaling circuit, a memory circuit, a first selecting circuit and a processing circuit. The scaling circuit scales down the secondary image to output a scaled-down secondary image. The memory circuit stores the main image and the scaled-down secondary image. The first selecting circuit is connected with a controlling circuit to receive an image selecting signal, and is connected with the memory circuit to select the scaled-down secondary image or the main image as an output according to the image selecting signal. The processing circuit is connected with the first selecting circuit to process the main image or the scaled-down image.

12 Claims, 5 Drawing Sheets

PIP PROCESSING APPARATUS AND METHOD THEREOF

BACKGROUND OF THE INVENTION

1. Field of Invention

The invention relates to an image processing apparatus and method thereof, and, in particular, to a PIP (Picture In Picture) processing apparatus and a processing method thereof.

2. Related Art

With the coming of video/audio ages, image displaying methods and image processing technology are developed rapidly, wherein the PIP (Picture In Picture) technology is the most widely used one for displaying images. The PIP technology allows the user to watch a plurality of channels easily or view different sections of a film simultaneously.

Illustrations will be made by taking the playing of television channels as an example, as shown in FIG. 1. When the television PIP channels are being played, a first channel image 1 is displayed in a frame 2. Next, the frame 2 is divided into a main image region 21 and a secondary image region 22 according to user's personal requirement or a default value. At this time, a second channel image 3 is scaled down to overwrite and replace the secondary image region 22 of the first channel image 1. Therefore, the user can watch the first channel image 1 and the second channel image 3 simultaneously. As mentioned hereinabove, the conventional television has to be equipped with a PIP processing apparatus to process the image data for the subsequent playing of the PIP channels when the above-mentioned PIP playing procedure is performed.

As shown in FIG. 2, a conventional PIP processing apparatus 4 is used in conjunction with a display 5. The PIP processing apparatus 4 includes a first processing circuit 41, a second processing circuit 42 and an overwriting circuit 43. The first processing circuit 41 receives and processes a main image 61 to generate a first to-be-displayed image 62. The second processing circuit 42 receives and processes a secondary image 63 to generate a second to-be-displayed image 64. At this time, when the display 5 wants to display the second channel image 3 in the secondary image region 22, as shown in FIG. 1, the overwriting circuit 43 receives the first to-be-displayed image 62 and the second to-be-displayed image 64, and overwrites and replaces the first to-be-displayed image 62 with the second to-be-displayed image 64 to output the second to-be-displayed image 64 to the display 5.

However, as mentioned hereinabove, the conventional PIP processing apparatus 4 has to provide two processing circuits (including the first processing circuit 41 and the second processing circuit 42) for respectively processing the main image 61 and the secondary image 63 when the display 5 wants to display the second channel image 3 in the secondary image region 22 (see FIG. 1). Thus, the conventional PIP processing apparatus 4 has larger product size and high product cost. As shown in FIG. 1, when the second channel image 3 scaled down to replace the first channel image 1 is displayed in the secondary image region 22, the memory has to provide the memory bandwidths for the main image 61 and the secondary image 63 simultaneously for the purpose of the subsequent display of the secondary image region 22. In other words, the conventional PIP processing apparatus 4 has to provide a redundant memory bandwidth to be shared with a partial main image 61 originally disposed in the secondary image region 22 (the secondary image region 22 is overwritten by the secondary image 63).

SUMMARY OF THE INVENTION

In view of the foregoing, the invention is to provide a PIP processing apparatus with a reduced number of image or video processing circuit and memory bandwidth usage.

To achieve the above, the invention discloses a PIP processing apparatus for processing a main image and a secondary image. The PIP processing apparatus includes a scaling circuit, a memory circuit, a first selecting circuit and a processing circuit. The scaling circuit scales down the secondary image to output a scaled-down secondary image. The memory circuit, which is connected with the scaling circuit, stores the main image and the scaled-down secondary image. The first selecting circuit, which is connected with a controlling circuit, receives an image selecting signal from the controlling circuit. The first selecting circuit is further connected with the memory circuit for selecting the scaled-down secondary image or the main image as an output according to the image selecting signal. The processing circuit, which is connected with the first selecting circuit, processes the scaled-down secondary image or the main image.

To achieve the above, the invention also discloses a PIP processing method for processing a main image and a secondary image. The secondary image is scaled down to output a scaled-down secondary image. The main image and the scaled-down secondary image are stored in a memory circuit. The scaled-down secondary image or the main image is selected from the memory circuit to be processed by a processing circuit according to the image selecting signal.

As mentioned above, when the PIP processing apparatus and method of the invention are processing the secondary image for scaling down, the scaled-down secondary image is read from the memory circuit, which is different from the prior art in which all the complete secondary image are read from the memory circuit. Thus, the access amount of the memory circuit of the invention is smaller and the invention is more efficient.

BRIEF DESCRIPTION OF THE DRAWINGS

The invention will become more fully understood from the detailed description given herein below illustration only, and thus is not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 1:
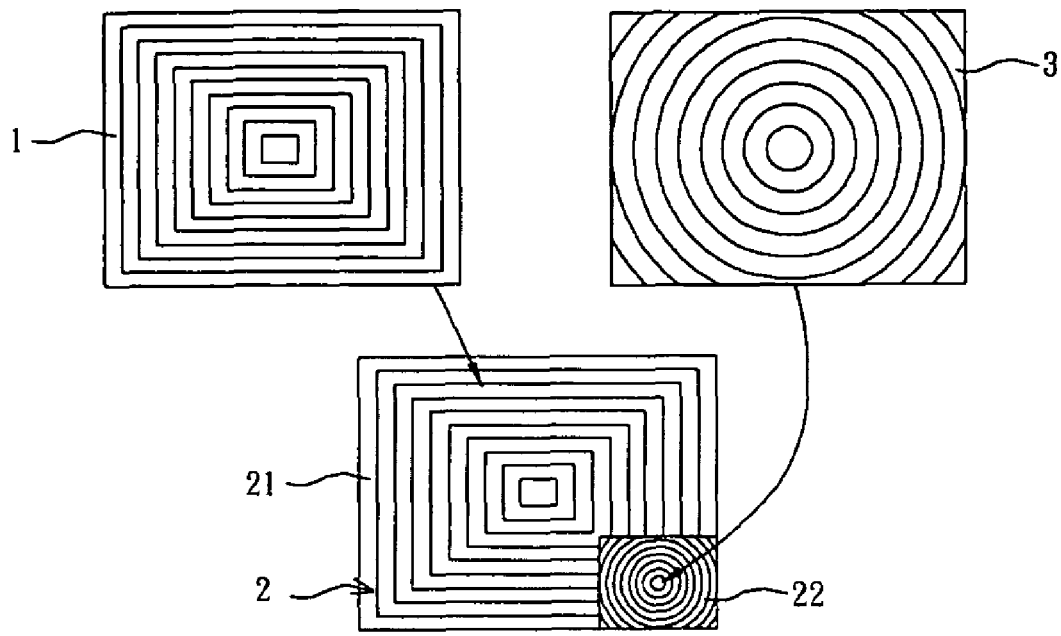
FIG. 1 is a schematic illustration showing a conventional PIP image display in a television.
Figure 2:
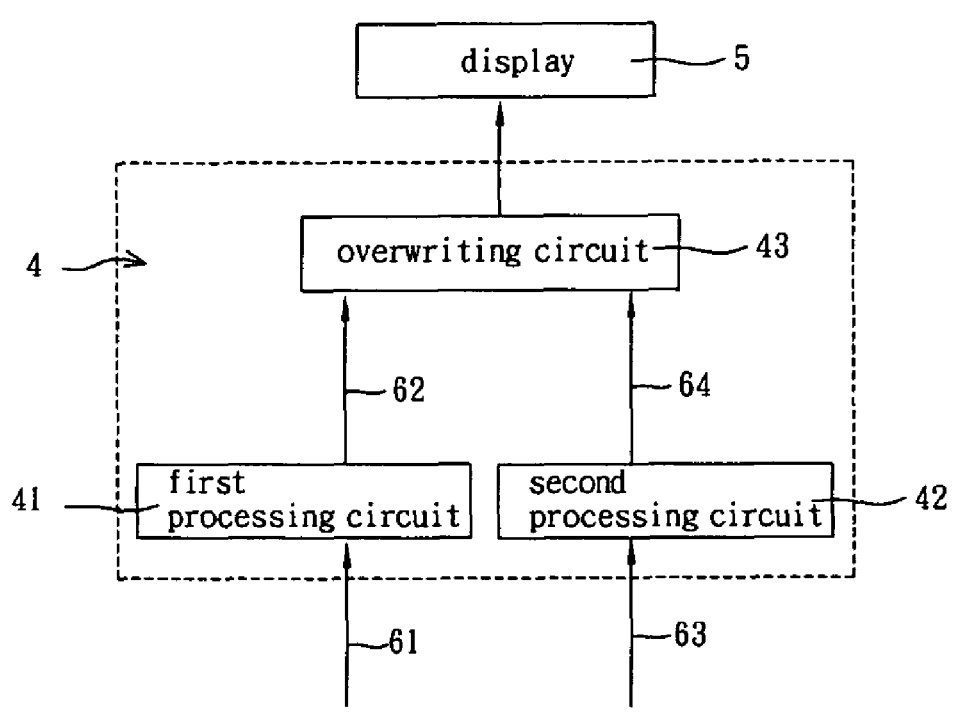
FIG. 2 is a schematic illustration showing a conventional PIP processing apparatus.
Figure 3:
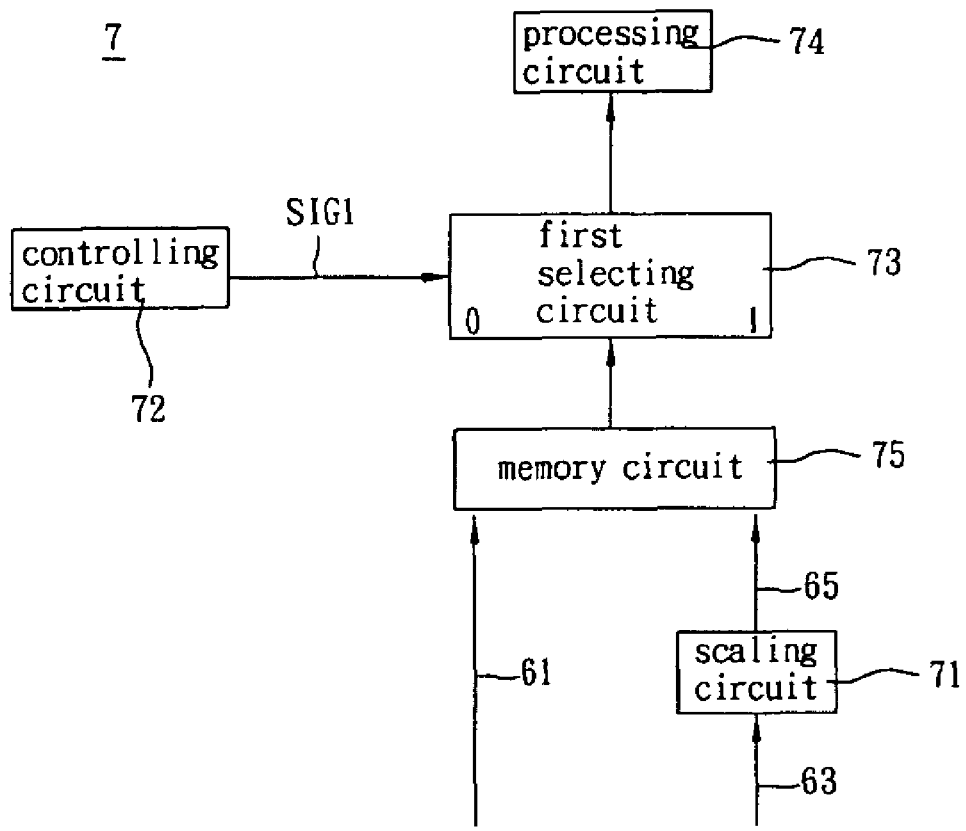
FIG. 3 is a schematic illustration showing a PIP processing apparatus according to an embodiment of the invention.

In the multimedia video technology, several transition effects, such as a dissolve effect, a split effect and a wipe effect, have been developed in order to enhance the vividness of the image conversion. The PIP processing apparatus and the PIP processing method according to the embodiments of the invention use the wipe effect to display an image in a main image region or a secondary image region of a frame. As shown in FIG. 3, a PIP processing apparatus 7 according to the embodiment of the invention processes a main image 61 and a secondary image 63, which are respectively displayed in the main image region 21 and the secondary image region 22 of the frame 2 of FIG. 1.

The PIP processing apparatus 7 includes a scaling circuit 71, a controlling circuit 72, a first selecting circuit 73, a processing circuit 74 and a memory circuit 75. The scaling circuit 71 receives the secondary image 63 and scales down the secondary image 63 to output a scaled-down secondary image 65. The memory circuit 75 stores the main image 61 and the scaled-down secondary image 65. The controlling circuit 72 judges whether the processing circuit 74 should process the main image region or the secondary image region, and outputs an image selecting signal SIG1 according to a judged result. The first selecting circuit 73 is connected with the controlling circuit 72 to receive the image selecting signal SIG1, and is connected with the memory circuit 75 to select the scaled-down secondary image 65 or the main image 61 as an output according to the image selecting signal SIG1. The processing circuit 74 is connected with the first selecting circuit 73 to process the main image 61 or the scaled-down secondary image 65 such that the main image 61 and the scaled-down secondary image 65 can be correctly displayed in the main image region 21 and the secondary image region 22 of the frame 2 in FIG. 1, respectively.

Figure 4:
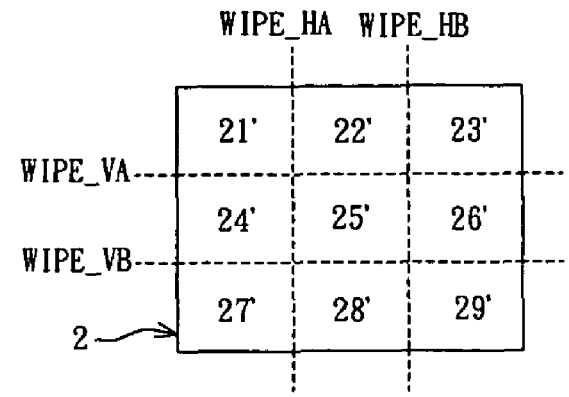
FIG. 4 is a schematic illustration showing a main image region and a secondary image region defined by a controlling circuit.

As shown in FIG. 4, the frame 2 is divided into a plurality of regions 21' to 29' according to two horizontal coordinate values WIPE_HA, WIPE_HB and two vertical coordinate values WIPE_VA, WIPE_VB. These regions may serve as the main image region or the secondary image region. For example, the region 21' serves as the secondary image region to display the scaled-down secondary image 65, and the regions 22' to 29' serve as the main image region to display the main image 61. In addition, the pixels in the frame 2 are processed in an order from top to bottom and from left to right. The controlling circuit 72 of FIG. 3 judges whether a target pixel pertains to the secondary image region or the main image region, and outputs the image selecting signal SIG1 according to the judged result. The image selecting signal SIG1 controls the first selecting circuit 73 to select the main image 61 or the scaled-down secondary image 65 as an output. The image outputted from the first selecting circuit 73 is inputted to the processing circuit 74. When the target pixel is disposed in the main image region, the image selecting signal SIG1 controls the first selecting circuit 73 to output the main image 61 to the processing circuit 74, which processes the main image 61 such that the main image 61 is displayed in the main image regions 22' to 29' of the frame 2. On the contrary, when the target pixel is disposed in the secondary image region 21', the image selecting signal SIG1 controls the first selecting circuit 73 to output the scaled-down secondary image 65 to the processing circuit 74. The processing circuit 74 processes the scaled-down secondary image 65 such that the scaled-down secondary image 65 is displayed in the secondary image region 21' of the frame 2. Consequently, the main image 61 and the scaled-down secondary image 65 may be respectively displayed in the main image regions 22' to 29' and the secondary image region 21' of the frame 2.

Figure 5:
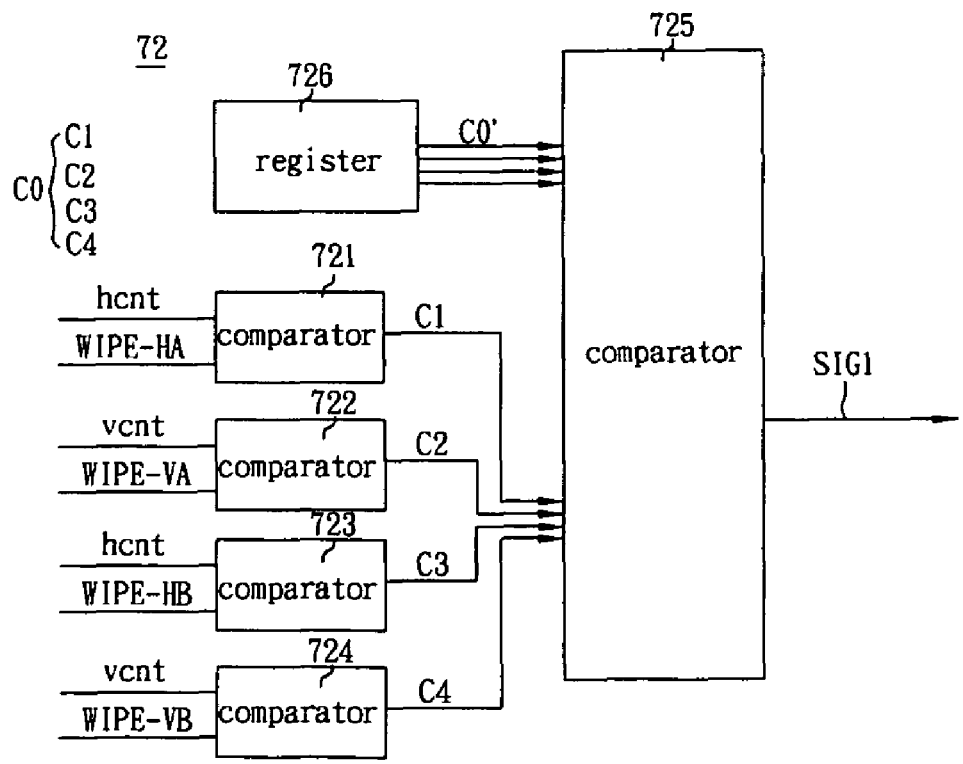
FIG. 5 is a schematic illustration showing the controlling circuit of the PIP processing apparatus of FIG. 3.

Referring to FIG. 5, the controlling circuit 72 includes a plurality of comparators 721 to 725 and a register 726. The comparators 721 to 724 judge the position of the target pixel to output a position comparison value C0. The register 726 records a corresponding code C0' of the secondary image region 21'. The comparator 725 is connected with the comparators 721 to 724 and the register 726 to receive the position comparison value C0 and the corresponding code C0'. The comparator 725 compares the position comparison value C0 with the corresponding code C0' to judge whether the target pixel falls in the secondary image region 21' and to output the image selecting signal SIG1. The horizontal position and the vertical position of the target pixel are represented by a horizontal counter value hcnt and a vertical counter value vcnt, and the corresponding information between the secondary image region 21' and the each of the regions 21' to 29' of the frame 2 is stored in the register 726.

The comparators 721 and 723 judge the horizontal position of the target pixel, and the comparators 722 and 724 judge the vertical position of the target pixel. The comparator 721 compares the horizontal counter value hcnt with the horizontal coordinate value WIPE_HA to output a comparison value C1. When the horizontal counter value hcnt is greater than the horizontal coordinate value WIPE_HA, the comparator 721 sets the comparison value C1 to 1. The comparator 723 compares the horizontal counter value hcnt with the horizontal coordinate value WIPE_HB to output a comparison value C3. When the horizontal counter value hcnt is greater than the horizontal coordinate value WIPE_HB, the comparator 723 sets the comparison value C3 to 1. The comparator 722 compares the vertical counter value vcnt with the vertical coordinate value WIPE_VA to output a comparison value C2. When the vertical counter value vcnt is greater than the vertical coordinate value WIPE_VA, the comparator 722 sets the comparison value C2 to 1. The comparator 724 compares the vertical counter value vcnt with the vertical coordinate value WIPE_VB to output a comparison value C4. When the vertical counter value vcnt is greater than the vertical coordinate value WIPE_VB, the comparator 724 sets the comparison value C4 to 1.

The comparison values C1 to C4 have different values when the target pixel corresponds to different frame regions. The comparison values C1 to C4 can be combined into a 4-bit position comparison value C0, which may have the values of "0000", "0010", "1010", "0100", "0110", "1110", "0101", "0111" and "1111" respectively corresponding to the regions 21' to 29' of the frame 2.

The register 726 records the corresponding code C0' of the secondary image region 21'. The corresponding code C0' is a 4-bit value. The corresponding relationship between the value of the corresponding code C0' and the regions 21' to 29' of the frame 2 is the same as that between the value of the position comparison value C0 and the regions 21' to 29' of the frame 2. The comparator 725 compares whether the position comparison value C0 and the corresponding code C0' are the same to output the image selecting signal SIG1. When the position comparison value C0 and the corresponding code C0' are the same, the comparator 725 sets the image selecting signal SIG1 to a first level "1", or otherwise sets the image selecting signal SIG1 to a second level "0". In addition, the corresponding code C0' may be set by a user such that the region of the frame 2 for displaying the secondary image may be changed.

As shown in FIG. 3, the first selecting circuit 73 may be a multiplexer. When the image selecting signal SIG1 is 0, the first selecting circuit 73 selects the main image 61 as an output, and the processing circuit 74 processes and displays the main image 61. When the image selecting signal SIG1 is 1, the first selecting circuit 73 selects the scaled-down secondary image 65 as an output, and the processing circuit 74 processes and displays the scaled-down secondary image 65.

Compared with the prior art, the conventional PIP processing apparatus 4 has to provide two processing circuits (the first processing circuit 41 and the second processing circuit 42) to process the data of the main image and the secondary image, respectively. However, the PIP processing apparatus 7 of this embodiment only needs one processing circuit 74 which is shared by the processing of the main image and the processing of the secondary image.

Figure 6:
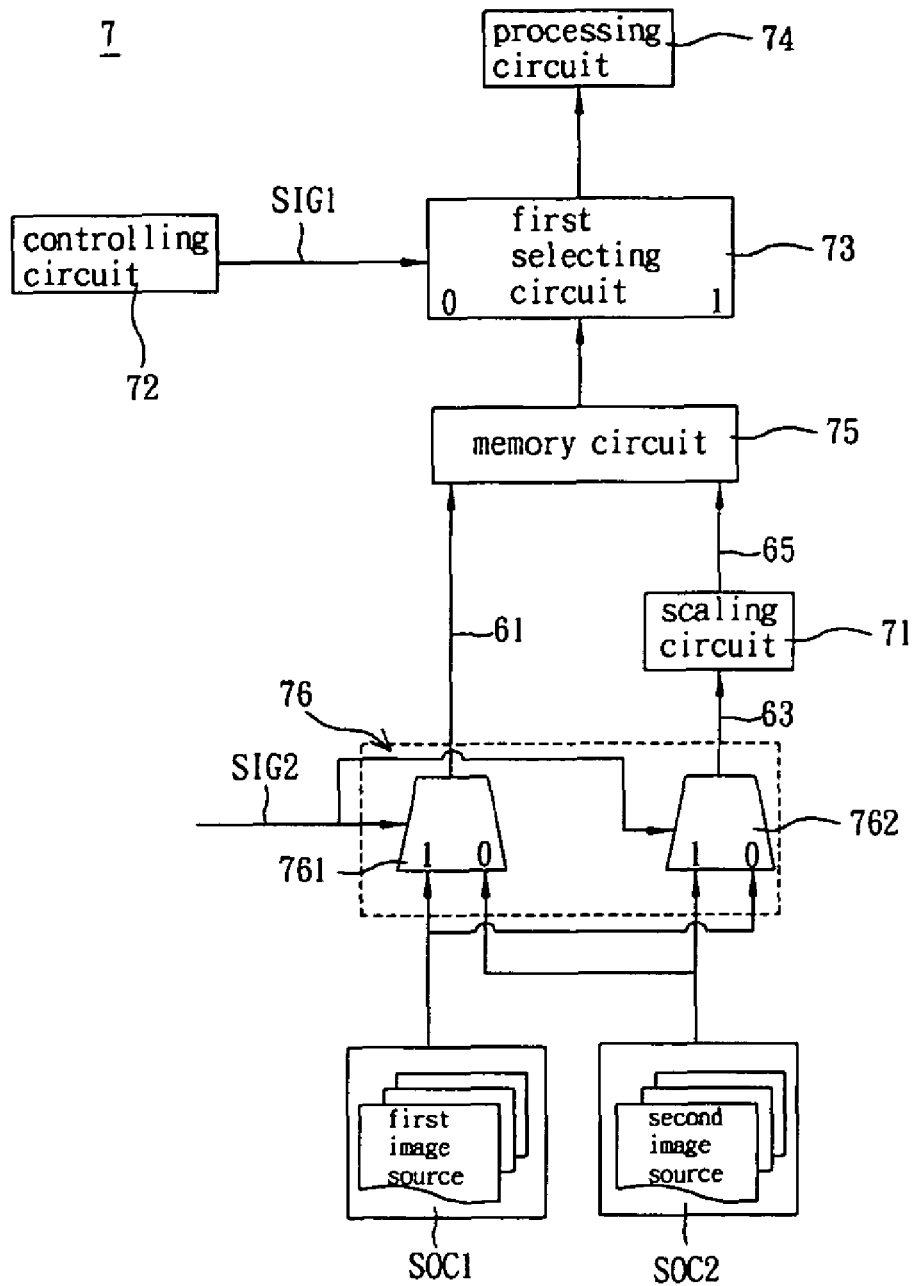
FIG. 6 is a schematic illustration showing another PIP processing apparatus according to the embodiment of the invention.

Differing from those disclosed in FIG. 3, the PIP processing apparatus 7 of FIG. 6 further includes a second selecting circuit 76, which includes a first multiplexer 761 and a second multiplexer 762. The first multiplexer 761 receives an image source selecting signal SIG2. When the image source selecting signal SIG2 has a first level (1), a first image of a first image source SOC1 is selected as the main image 61. When the image source selecting signal SIG2 has a second level (0), a second image of a second image source SOC2 is selected as the main image. The second multiplexer 762 receives the image source selecting signal SIG2. When the image source selecting signal SIG2 has the first level (1), the second image of the second image source SOC2 is selected as the secondary image 63. When the image source selecting signal SIG2 has the second level (0), the first image of the first image source SOC1 is selected as the secondary image 63.

As mentioned above, it is described that the image source can be switched to serve as the main image or the secondary image.

Figure 7:
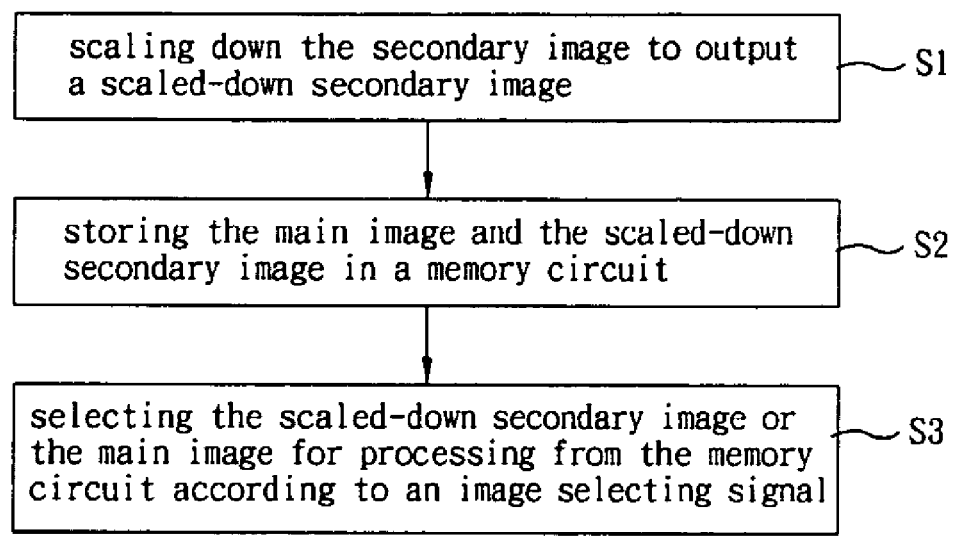
FIG. 7 is a flow chart showing a PIP processing method according to another embodiment of the invention.

Referring to FIG. 7, a PIP processing method according to a second preferred embodiment of the invention processes a main image and a secondary image and includes steps S1 to S3. The secondary image is scaled down to output a scaled-down secondary image in Step S1. The main image and the scaled-down secondary image are stored in a memory circuit in Step S2. The scaled-down secondary image or the main image for processing is selected from the memory circuit according to an image selecting signal in Step S3. The PIP processing method of the embodiment may be applied to the PIP processing apparatus 7, which has been discussed in FIGS. 3 to 6 according to the previous embodiment. Thus, the detailed descriptions of the PIP processing method of the embodiment will be omitted.

In summary, when the PIP processing apparatus and method of the invention are processing the secondary image, the scaled-down secondary image is read from the memory circuit, which is different from the prior art in which all the complete secondary image are read from the memory circuit. Thus, the access amount of the memory circuit of the invention is smaller and the invention is more efficient.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A PIP processing apparatus for processing a main image and a secondary image, the PIP processing apparatus comprising:
   a scaling circuit provided for scaling down the secondary image to output a scaled-down secondary image;
   a memory circuit connected with the scaling circuit for storing the main image and the scaled-down secondary image;
   a first selecting circuit connected with a controlling circuit for receiving an image selecting signal from the controlling circuit, and connected with the memory circuit for selecting the scaled-down secondary image or the main image as an output according to the image selecting signal; and
   a processing circuit connected with the first selecting circuit for processing the scaled-down secondary image or the main image,
   wherein the controlling circuit comprises:
      a plurality of first comparators for judging a position of a target pixel in a frame to output a position comparison value;
      a register for recording a corresponding code of a secondary image region in the frame; and
      a second comparator connected with the first comparators and the register for receiving the position comparison value and the corresponding code, and comparing the position comparison value with the corresponding code to output the image selecting signal.

2. The apparatus according to claim 1, wherein the controlling circuit judges whether a target pixel pertains to a secondary image region or a main image region of a frame and thus outputs the image selecting signal.

3. The apparatus according to claim 2, wherein:
   when the target pixel is located in the main image region, the image selecting signal controls the first selecting circuit to output the main image to the processing circuit.

4. The apparatus according to claim 2, wherein:
   when the target pixel is located in the secondary image region, the image selecting signal controls the first selecting circuit to output the scaled-down secondary image to the processing circuit.

5. The apparatus according to claim 1, wherein the frame is divided into a plurality of regions respectively serving as a main image region or the secondary image region according to at least one horizontal coordinate value and at least one vertical coordinate value.

6. The apparatus according to claim 5, wherein the first comparators compares a horizontal position and a vertical position of the target pixel respectively with the horizontal coordinate value and the vertical coordinate value to output the position comparison value.

7. The apparatus according to claim 1, further comprising a second selecting circuit, wherein the second selecting circuit comprises:
   a first multiplexer for receiving an image source selecting signal, selecting a first image as the main image when the image source selecting signal is at a first level, and selecting a second image as the main image when the image source selecting signal is at a second level; and
   a second multiplexer for receiving the image source selecting signal, selecting the second image as the secondary image when the image source selecting signal is at the first level, and selecting the first image as the secondary image when the image source selecting signal is at the second level.

8. A PIP processing method for processing a main image and a secondary image, the method comprising:
   scaling down the secondary image to output a scaled-down secondary image;
   storing the main image and the scaled-down secondary image in a memory circuit;
   selecting the scaled-down secondary image or the main image from the memory circuit to be processed according to an image selecting signal; and judging whether a target pixel pertains to a secondary image region or a main image region of a frame and thus outputting the image selecting signal,
wherein the frame is divided into a plurality of regions respectively served as the main image region or the secondary image region according to at least one horizontal coordinate value and at least one vertical coordinate value.

9. The method according to claim 8, wherein:
when the target pixel is located in the main image region, the image selecting signal controls to process the main image.

10. The method according to claim 8, wherein:
when the target pixel is located in the secondary image region, the image selecting signal controls to process the scaled-down secondary image.

11. The method according to claim 8, further comprising:
comparing a horizontal position and a vertical position of the target pixel respectively with the horizontal coordinate value and the vertical coordinate value to output a position comparison value; and
comparing the position comparison value with a corresponding code to output the image selecting signal.

12. The method according to claim 8, further comprising:
selecting a first image as the main image and selecting a second image as the secondary image when an image source selecting signal is at a first level; and
selecting the second image as the main image and selecting the first image as the secondary image when the image source selecting signal is at the second level.

* * * * *